(12) United States Patent
Scheffzück

(10) Patent No.: US 6,220,668 B1
(45) Date of Patent: Apr. 24, 2001

(54) HEADREST FOR VEHICLE SEATS WITH SWIVELLABLE SIDE CHEEKS

(75) Inventor: Matthias Scheffzück, Tübingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/434,279

(22) Filed: Nov. 5, 1999

(30) Foreign Application Priority Data

Nov. 5, 1998 (DE) .............................................. 198 51 027

(51) Int. Cl.⁷ .................................................. B60N 2/48
(52) U.S. Cl. ........................... 297/391; 297/403; 297/464
(58) Field of Search ................................ 297/403, 284.9, 297/350, 391, 464

(56) References Cited

U.S. PATENT DOCUMENTS

| | | | |
|---|---|---|---|
| 2,976,915 | * 3/1961 | Spound | 297/403 X |
| 4,913,491 | * 4/1990 | Mizuno et al. | 297/284.9 |
| 5,411,468 | * 5/1995 | Chen | 297/391 |
| 5,531,505 | 7/1996 | Baetz et al. . | |
| 5,669,668 | * 9/1997 | Leuchtmann | 297/403 X |
| 5,752,742 | * 5/1998 | Kerner et al. | 297/391 |
| 5,806,933 | * 9/1998 | Tsui et al. | 297/391 |
| 5,997,091 | * 12/1999 | Rech et al. | 297/391 |

FOREIGN PATENT DOCUMENTS

| | | | |
|---|---|---|---|
| 3621278 | * 1/1988 | (DE) | 297/403 |
| 195 28 716 | 2/1997 | (DE) . | |
| 196 53 516 | 6/1997 | (DE) . | |
| 197 24 764 | 10/1998 | (DE) . | |
| 19754168 | 6/1999 | (DE) . | |
| 2132479 | * 7/1984 | (GB) | 297/403 |
| 2 302 268 | 1/1997 | (GB) . | |

\* cited by examiner

*Primary Examiner*—Peter R. Crown
(74) *Attorney, Agent, or Firm*—Evenson, McKeown, Edwards & Lenahan, P.L.L.C.

(57) ABSTRACT

A headrest for vehicle seats, has a head cushion and two side cheeks which are assigned to the head cushion and which, in the in-use position, project laterally on the head cushion beyond the cushion front. In their not-in-use position, the side cheeks can be swivelled into the contour of the head cushion. In order not to impair the cushion contour of the head cushion designed under aspects of safety and comport by the use of the side cheeks, the two identically constructed side cheeks are mirror-symmetrically swivellably arranged with respect to the vertical center line of the head cushion such that, in the not-in-use position, they cover the back side of the head cushion.

8 Claims, 1 Drawing Sheet

HEADREST FOR VEHICLE SEATS WITH SWIVELLABLE SIDE CHEEKS

BACKGROUND OF THE INVENTION

This application claims the priority of 198 51 027.6-16, filed Nov. 11, 1998, the disclosure of which is expressly incorporated by reference herein.

The invention relates to a headrest for vehicle seats, and more particularly, to a headrest having a head cushion and two side cheeks which are assigned to the head cushion and which, in an in-use position, project laterally on the head cushion beyond the cushion front and, in their not-in-use position, can be swivelled into a contour of the head cushion.

In a known headrest of the type shown in DE 195 28 716 A1, (corresponding to U.S. Pat. No. 5,752,742) the head cushion consists of an upper and a lower cushion elevation. Two identically constructed side cheeks each have a parallelepiped-shaped basic cushion body which rests between the two cushion elevations and has a depth corresponding to the depth of the cushion elevations as well as a cushioned wedge piece which continues therefrom in one piece. The two wedge pieces are constructed such that, in the not-in-use position of the side cheeks, they overlap one another between the cushion elevations viewed in their depth and close off approximately flush with the front and back side of the cushion elevations.

In a driving operation, such a known headrest has a compact minimal dimension and allows the driver to sufficiently look toward the rear and sideways. In the not-in-use phase, this headrest offers side cheeks which can be swivelled out and which prevent the head from rolling off. When the side cheeks are in use, however, as the result of the folded-out side cheeks, a recess is formed in the head cushion. This is not a problem when the headrest is used in a non-driving operation. However, when the side cheeks are used in the driving operation by the front seat passenger or other passengers, the safety and comfort features of the known headrest are not made available because of the recess formed by folding out the side cheeks.

SUMMARY OF THE INVENTION

An object of the present invention is to provide an improved headrest in which the cushion contour of the headrest aimed at safety and comfort demands is not impaired by the use of the side cheeks.

According to the invention, this object has been achieved by providing that the two side cheeks have an identical construction and are mirror-symmetrically swivellably arranged with respect to the vertical center line of the head cushion such that, in the not-in-use position, they cover the back side of the head cushion.

The headrest according to the present invention has the advantage that the front-side cushion contour of the head cushion remains unaffected by the swivelling operation of the side cheeks and can therefore be designed exclusively according to aspects of safety and comfort. The two side cheeks have an identical construction, can be produced at reasonable cost and, when not in use, fold together on the back side of the head cushion so that the head cushion has a compact dimension without projecting parts which fold out and form a recess in the head cushion.

The sides of the side cheeks in the in-use position swivel and face towards the front of the vehicle, and in the not-in-use position, these sides swivel back and form the back side of the compact unit including the side cheeks and the head cushion. Accordingly, the side cheeks are capable of being folded onto the back side of the head cushion. As a result, a uniform component is created with aesthetically attractive outer surfaces which can be integrated without any problem into the design of the interior of the vehicle.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
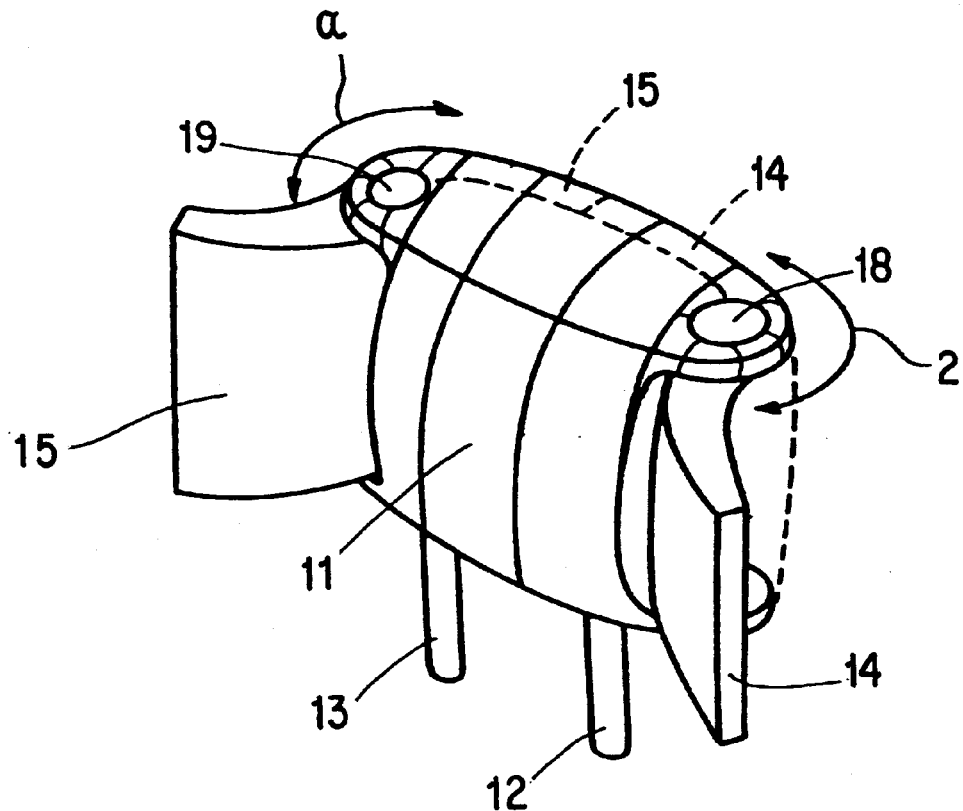
FIG. 1 is a schematic perspective frontal view of a headrest for a vehicle seat according to the present invention.
Figure 2:
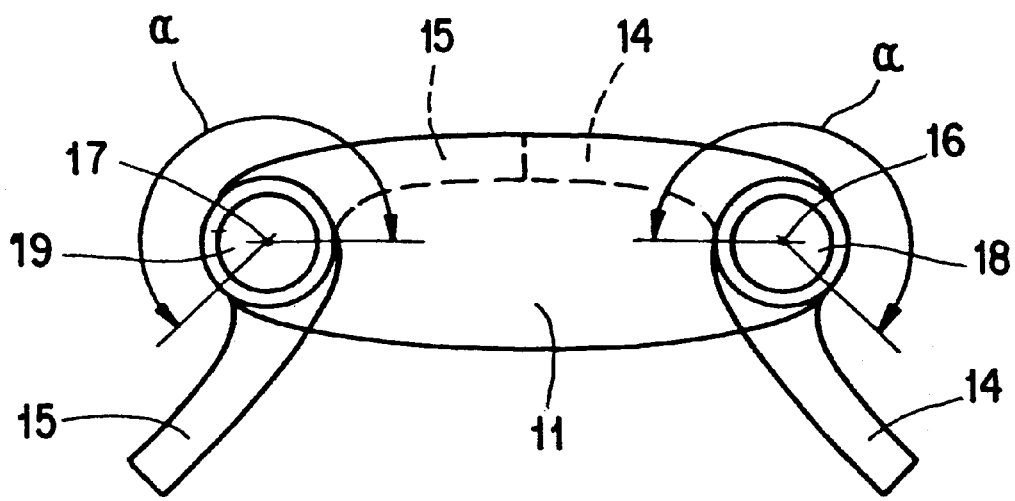
FIG. 2 is a schematic top view of the headrest shown in FIG. 1.

The headrest for a vehicle seat with a backrest illustrated in FIGS. 1 and 2, has a head cushion 11 which is fastened on two supporting rods 12, 13 extend at a transverse distance from one another. The supporting rods 12, 13 are used for holding the headrest in the backrest and are guided in it in a vertically adjustable manner. Two side cheeks 14, 15 are assigned to the head cushion 11 and can each be swivelled about a vertical swivelling axis 16, 17 fixed in the head cushion 11. The vertical height of the side cheeks 14, 15 is selected to be smaller than the vertical height of the head cushion 11 so that the two side cheeks 14, 15 are covered on their top and bottom side by an area of the head cushion 11.

The two side cheeks 14, 15 have an identical construction and are arranged mirror-symmetrically with respect to the center line of the head cushion 11 such that, in their not-in-use position, they cover the back side of the head cushion 11. From this not-in-use position, the side cheeks 14, 15 can be swivelled out by a swivel angle α which ranges between at least 180° and maximally 270°. A locking device can be assigned to each side cheek 14, 15 to automatically lock the respective side cheek 14, 15 at least in its two end swivel positions, i.e, as in-use position and a not-in-use position.

A push button 18, 19 arranged in the top side of the head cushion 11 unlocks each locking device so that the side cheeks 14, 15 can be changed for their one end position into the respective other end position, where they are then automatically locked again by the locking device. The side cheeks 14, 15 and the head cushion 11 are mutually coordinated such that the two side cheeks 14, 15, which are folded onto the back side of the head cushion 11 and abut one another in the center, form a closed-surface constructional unit together with the head cushion 11, as illustrated by broken lines in FIGS. 1 and 2. With respect to its shape, surface design and color, the closed-surface constructional unit can be adapted without any problem to the design of the vehicle interior.

The foregoing disclosure has been set forth merely to illustrate the invention and is not intended to be limiting. Since modifications of the disclosed embodiments incorporating the sprit and substance of the invention may occur to persons skilled in the art, the invention should be construed to include everything within the scope of the appended claims and equivalents thereof.

What is claimed is:

1. A headrest for vehicle seats, comprising a head cushion and two side cheeks associated with the head cushion and which, in an in-use position thereof, project laterally on the head cushion beyond the front of the head cushion and, in a not-in-use position thereof, are swivellable into a contour of the head cushion, wherein the two side cheeks have an identical construction and are mirror-symmetrically swivellably arranged with respect to a vertical center line of the head cushion so as, in the not-in-use position thereof, to cover a back side of the head cushion.

2. The headrest according to claim 1, wherein each of the side cheeks are swivellably arranged about a vertical swivel axis fixed on the head cushion to swivel through a swivel angle ($\alpha$) between substantially 180° and 270°.

3. The headrest according to claim 1, wherein the side cheeks and the head cushion are operatively coordinated with one another such that the side cheeks folded onto the back side of the head cushion, together with the head cushion, form a closed-surface constructional unit adaptable to a design of the vehicle interior.

4. The headrest according to one of claim 3, wherein each of the side cheeks are swivellably arranged about a vertical swivel axis fixed on the head cushion to swivel through a swivel angle ($\alpha$) between substantially 180° and 270°.

5. The headrest according to claim 1, wherein each side cheek, is adaptable to have a manually unlockable locking device to lock the respective side cheek at least in each of end swivel positions thereof.

6. The headrest according to claim 5, wherein each of the side cheeks are swivellably arranged about a vertical swivel axis fixed on the head cushion to swivel through a swivel angle ($\alpha$) between substantially 180° and 270°.

7. The head rest according to claim 6, wherein the side cheeks and the head cushion are operatively coordinated with one another such that the side cheeks folded onto the back side of the head cushion, together with the head cushion, form a closed-surface constructional unit adaptable to a design of the vehicle interior.

8. The headrest according to claim 5, wherein an unlocking button is arranged on a top side of the head cushion.

* * * * *